Nov. 16, 1926.  1,607,291
R. MARIE
PROCESS FOR THE RECOVERY OF THE RUBBER AND COTTON CONTAINED IN USED
MOTOR CAR PNEUMATIC TIRES
Filed Oct. 2, 1925
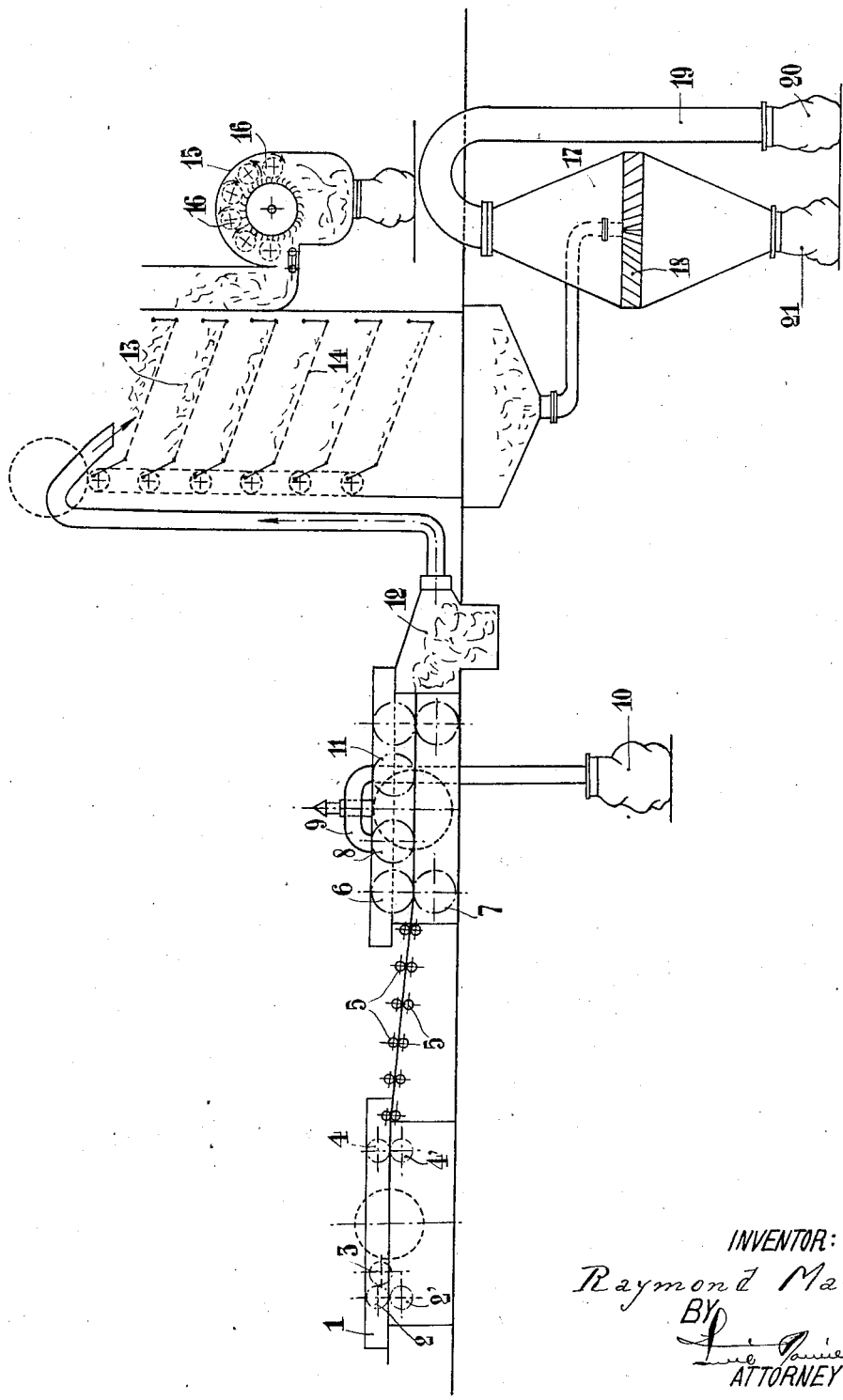
INVENTOR:
Raymond Marie
BY
ATTORNEY Patented Nov. 16, 1926.

1,607,291

UNITED STATES PATENT OFFICE.

RAYMOND MARIE, OF COLOMBES, FRANCE.

PROCESS FOR THE RECOVERY OF THE RUBBER AND COTTON CONTAINED IN USED MOTOR-CAR PNEUMATIC TIRES.

Application filed October 2, 1925. Serial No. 60,107.

The object of my invention is an improved process for so treating used motor-car pneumatic tires as to recover their main constituent materials, i. e., rubber and cotton. At the end of such treatment the rubber may either be utilized again for manufacturing revived rubber or be re-assimilated directly with other mixtures in order to improve them (beads, treads).

The cotton is usable for making paper pulp; re-spinning; machine-wiping waste (as to lowest grades); absorbent-cotton wool manufacture; cushions and mattress padding.

My process permits absolutely pure rubber to be obtained, that is to say, rubber free from any foreign body; on the other hand, cotton is recovered in clean condition, that is, free from any particles of rubber and from any foreign body.

In order to make my invention more clearly understood I have illustrated in the accompanying drawing a diagrammatic, part-sectional side elevation of one form of apparatus for carrying out the invention.

My process consists of the following treatment: Beads are first removed from the tires by the hereinafter described machine, through the following operations:

*First operation.*—The tires are first severed diametrically into four equal sections, and each of these sections is then placed flatwise on a cutting board 1 whereon it is kept flat by two small cylinders or rollers 2 and 2' which feed it towards two circular saws 3 (only one of which appears) mounted on the same spindle, such saws being straight toothed and previously so set as to just sever the two beads along the proper line. A water supply will facilitate the sawing off. Two other small cylinders or rollers 4, 4' feed the bead-stripped tire towards the discharging end of the board.

*Second operation.*—The pieces so obtained are mechanically fed either by means of rollers 5 or otherwise to a machine constituted by two tables positioned one above the other and in the space between which are two rollers or cylinders 6 and 7 which serve to feed the tire while keeping it flat. The tire is next engaged by a cylinder 8 larger in diameter and provided with toothed knives or blades. Said cylinder, rotated at high speed, strips the rubber from the tire just along the canvas limit but without touching the canvas. The rubber is then picked up by a suction device 9 and discharged into a receptacle 10. The remaining part of the tire is then operated upon in the same way by a cylinder 11 located farther on. It may here be stated that the canvas which remains must be completely shredded, and for this purpose is fed and treated in the manner above described, but in such a way as to be presented in a loose state for the second shredding operation.

The cotton thus torn to fragments falls into a conveying device 12 which delivers it to a special shaking sifter 13, hereinafter described and designed to clean the cotton that contains at this time very fine particles of rubber.

The apparatus shown at 13 will give several grades of cotton and at its lower part there will be collected a mass composed of very fine dust and cotton particles considered as waste although usable for felt-rubber article manufacturing.

Sifter 13 is composed of a plurality of superposed shaking screens 14 of different mesh or gauge, in order that the particles of rubber may drop through, leaving the cotton absolutely gum-free.

Said sifter is actuated by a series of sprocket gears and chains imparting to each screen the reciprocating motion required to effect separation.

The apparatus throws off no dust since it is enclosed in a casing made of thin sheet-iron or of match boards.

From sifter 13 the various cotton grades drop into a machine 15 provided with several ravelling rollers 16 serving to open out the threads and render the cottong suitable for spinning or for absorbent cotton wool manufacturing.

The material obtained from the lowest screens of sifter 13 requires cleaning; and for this purpose it is fed through a pipe into an apparatus 17 by the action of a pneumatic device composed of a turbine or blower 18 or of a helicoidal fan; said device operating as follows:

The material is fed to the turbine 18 which spreads it out in a very thin sheet so as to permit whatever rubber is contained therein first to separate therefrom by gravity and also to permit fine particles to be removed by suction in order to purify and clean the material; the particles so removed being led out through a channel 19 and discharged into a bag or other collector 20, while the heavier particles of rubber fall of their own weight at the center of the apparatus and are collected at 21.

Used beads are treated separately in a special machine.

Having now particularly ascertained and described the nature of my said invention as well as the manner in which the same is to be performed, I declare that what I claim is:

A process for recovering the rubber and cotton contained in used motor-car tires, comprising the steps of: dividing the tire into equal sections along its diameter; removing the beads from each section; separating and collecting the rubber constituent thereof; shredding the canvas part of the section after it has been freed from the rubber; sifting the so-liberated cotton fibers to sort and separate them from the particles of rubber still mingled therewith; again shredding the freed cotton fibers so as to open them out, and then collecting them; and separating the last cotton remnants from any particles of rubber still remaining by subjecting them to the action of a pneumatic device which will permit the rubber particles to fall by gravity and will blow out the cotton waste.

In testimony whereof I affix my signature.

RAYMOND MARIE.